(12) United States Patent
Fangmann et al.

(10) Patent No.: US 6,475,380 B1
(45) Date of Patent: Nov. 5, 2002

(54) HYDRAULIC OIL RESERVOIR

(75) Inventors: Thomas Fangmann, Dinklage (DE); Dieter Gröger, Damme (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/762,141

(22) PCT Filed: May 30, 2000

(86) PCT No.: PCT/DE00/01730

§ 371 (c)(1), (2), (4) Date: Mar. 22, 2001

(87) PCT Pub. No.: WO00/75494

PCT Pub. Date: Dec. 14, 2000

(30) Foreign Application Priority Data

Jun. 4, 1999 (DE) .......................................... 199 25 635

(51) Int. Cl.⁷ ...................... B01D 35/027; B01D 35/147
(52) U.S. Cl. ...................... 210/120; 210/131; 210/136; 210/172; 210/436; 210/443; 210/455
(58) Field of Search ................................. 210/120, 136, 210/172, 131, 436, 453, 455, 462, 472, 440, 443

(56) References Cited

U.S. PATENT DOCUMENTS

| | | | | |
|---|---|---|---|---|
| 2,422,647 A | * | 6/1947 | Vokes .......................... 210/131 |
| 3,214,023 A | * | 10/1965 | Donner ......................... 210/172 |
| 3,572,508 A | * | 3/1971 | Rice ............................. 210/172 |
| 3,747,761 A | * | 7/1973 | Heinrich, Jr. ................ 210/232 |
| 3,750,888 A | * | 8/1973 | Rinaldo ....................... 210/451 |
| 3,786,920 A | | 1/1974 | Raymond |
| 3,853,763 A | * | 12/1974 | Hall ............................. 210/130 |
| 3,928,201 A | * | 12/1975 | Junck et al. ................. 210/130 |
| 4,273,651 A | * | 6/1981 | Rosaen ........................ 210/130 |
| 4,853,125 A | * | 8/1989 | Hanabusa .................... 210/172 |
| 4,915,852 A | * | 4/1990 | Timlinson .................... 210/805 |
| 4,997,555 A | * | 3/1991 | Church et al. ............... 210/136 |

FOREIGN PATENT DOCUMENTS

| | | | |
|---|---|---|---|
| DE | 77 29 352 | 9/1977 | |
| DE | 2815993 | * 10/1979 | ................. 210/172 |
| DE | 87 00 021 | 1/1987 | |
| DE | 195 39 759 | 10/1995 | |

* cited by examiner

*Primary Examiner*—Matthew O. Savage
(74) *Attorney, Agent, or Firm*—McGlew and Tuttle, P.C.

(57) ABSTRACT

A hydraulic fluid tank for motor vehicles has a fluid filter (1). The fluid filter (1) is inserted into a filter housing (3) present in the hydraulic fluid tank (2). The filter housing (3) may have a two-part design. The filter housing (3) may have an upper part (4) and a lower part (5), which are connected by a lock-in or snap connection.

17 Claims, 3 Drawing Sheets

HYDRAULIC OIL RESERVOIR

FIELD OF THE INVENTION

The present invention pertains to a hydraulic fluid tank for motor vehicles with a fluid filter.

BACKGROUND OF THE INVENTION

Such hydraulic fluid tanks are part of the hydraulic system in motor vehicles. The necessary hydraulic pressure is generated by a hydraulic pump. The connection between the individual elements of the hydraulic system is established by means of hydraulic lines. A fluid filter, which is used to filter the fluid flowing back from the servo elements of the motor vehicle, is inserted into the hydraulic fluid tank. Both coarse fibrous filters and fine paper filters, which are used corresponding to the requirements imposed, have been known as fluid filters.

It is necessary to dimension the filter area of the fluid filter such that a sufficient reserve is available at the expectable average contamination of the fluid filter relative to its service life for a maximum dynamic pressure to be exceeded in the hydraulic system, because the clogging of the pores of the fluid filter implies the risk that the dynamic pressure will increase uncontrollably within the hydraulic system, as a result of which the function of individual units may be disturbed or lost altogether.

However, this also means that the size of the fluid filter must increase if a finer filter material is used in order to make available a sufficient reserve filter surface because the finer pores are naturally also clogged by contaminants more rapidly than are coarser ones. Moreover, it must also be guaranteed that the fluid filter is always arranged beneath the fluid level in the hydraulic fluid tank during the operation because it would otherwise draw in air, which may compromise the ability of the units of the motor vehicle to function in the hydraulic system.

The essential requirement that the hydraulic fluid tank accommodating the fluid filter must be increased arises in connection with the above requirement, which is ultimately also of significance in the oblique position of the motor vehicle, and this requirement to increase the size of the fluid filter is disadvantageous not only because the space available for installation in the engine compartment is increasingly smaller, but also because such a hydraulic fluid tank requires a large amount of material and is expensive. The requirements on the fineness of the filter and on the dynamic pressure predetermine the necessary size of the fluid filter and consequently the amount of fluid as well as the size of the hydraulic fluid tank in solutions according to the prior art.

SUMMARY AND OBJECTS OF THE INVENTION

The basic object of the present invention is to provide a hydraulic fluid tank which also permits fine-pored fluid filters to be used at a small size.

This technical object is accomplished according to the present invention with a hydraulic fluid tank for motor vehicles with a fluid filter. The fluid filter is inserted into a filter housing present in the hydraulic fluid tank.

Thus, it is provided that the fluid filter is inserted into a separate filter housing present in the hydraulic fluid tank.

The fluid filter is thus accommodated within the hydraulic fluid tank in a completely encapsulated form. This encapsulation always guarantees that the fluid filter is arranged completely beneath the fluid level built up within the inner filter housing. This is also true with the motor vehicle in an oblique position.

As a result, it also becomes possible to use very fine fluid filter materials because the size of the filter housing can occupy a large part of the interior space of the hydraulic fluid tank and there are only few limitations to the free design of the filter housing.

Thus, it is particularly advantageous to design the filter housing as a two-part housing, which comprises, e.g., an upper part and a lower part, which may be connected to one another by means of a lock-in or snap connection. Other types of connection are, of course, possible as well.

A collar, which is inserted in a firmly seated and sealing manner into a complementary axial flange present in the hydraulic fluid tank, is made in one piece according to the present invention with the outer surface of the lower part of the filter housing accommodating the fluid filter.

The lower bottom of the lower part has, furthermore, an admission opening, through which the hydraulic fluid to be filtered flows into the fluid filter through at least one pressure pipe joint within an admission chamber formed by the axial flange.

Moreover, it is expedient to provide in the lower part of the filter housing at least one outlet opening, through which the filtered hydraulic fluid can flow over into the hydraulic fluid tank.

The hydraulic fluid thus flows over the pressure pipe joint into the admission chamber, then passes through the admission opening of the lower part, is pressed through the fibrous material of the filter and is filtered in the process in order to be subsequently discharged through the outlet opening into the hydraulic fluid tank. It can now be fed into the hydraulic system in the purified form.

According to another embodiment of the present invention, an additional filter material is also provided in the outlet opening.

The fluid filter should be supported within the filter housing against the force of a spring element. The supporting of the fluid filter via a spring element means an additional safety aspect for the entire system, because if the fluid filter were completely clogged, the dynamic pressure present in the entire system would increase disproportionately. This pressure would consequently also affect the interior space of the fluid filter via the pressure pipe joint and the admission chamber, so that there could be a risk of destruction of certain components. The fluid filter would be raised by a small amount in this case in the axial direction against the force of the spring element, so that the fluid can flow under the raised fluid filter in the direction of the outlet opening and thus it can be fed into the entire system.

Thus, this solution describes a bypass, which offers the advantage over pressure relief valves arranged above the fluid filter that dirt particles already present in the fluid filter material cannot be removed from the filter material and cannot be returned into the hydraulic system, because the hydraulic fluid is discharged below the fluid filter.

On the whole, it is guaranteed in a solution according to the present invention because of a first filling under vacuum that the fluid level within the filter housing is always higher than the fluid level in the hydraulic fluid tank.

There is, of course, also a risk that the filter housing is dislodged from its anchoring in the hydraulic fluid tank. To avoid this and thus to limit the axial mobility of the filter housing as a whole, it is propvided, furthermore, that a holding-down device be arranged either on the inner surface of the hydraulic fluid tank or on the outer surface of the upper part of the filter housing, which holding-down device is located at a closely spaced location only from the surface of the corresponding other component, which surface is associated with it in an opposing manner.

The hydraulic fluid tank according to the invention being described here can be manufactured as a whole from plastic in an advantageous manner. It may comprise a plurality of individual parts in the preassembled state, which are connected to one another after the introduction of the filter housing into the hydraulic fluid tank by, e.g., ultrasonic or orbital welding or bonding and thus they ultimately form a one-part component. Other types of connection of the individual parts of the hydraulic fluid tank may, of course, be applied as well instead of the above-mentioned types. What is meant here is, e.g., screw connections or snap connections with the insertion of corresponding sealing elements, etc.

Fibrous, metal or paper filters of a fineness adapted to the needs may be used as filter materials for both the fluid filter and a corresponding insert.

A hydraulic fluid tank according to the present invention has a number of advantages over that known from the prior art.

Due to the encapsulation of the filter housing, a very large filter area can be used. This may correspondingly have a greater pore fineness than is possible in the solutions known from the state of the art. The hydraulic fluid tanks according to the present invention can also be made, on the whole, smaller.

The admission of air into the hydraulic system is nearly ruled out because the fluid filter is always arranged beneath the fluid level as a consequence of the fluid filter in the filter housing being encapsulated. Since the filter housing is a closed, encapsulated system, the fluid level cannot drop by itself within the filter housing. The dynamic pressure can be limited to a predetermined, maximum value, so that the destruction of the system is avoided with a hydraulic fluid tank according to the present invention.

Moreover, the simple design of the bypass used for this prevents particles already filtered out of the hydraulic fluid from being entrained from the fluid filter and from being returned into the system, because the fluid flows under the fluid filter.

Two embodiments of a hydraulic fluid tank according to the present invention will be described in greater detail below with reference to the corresponding drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
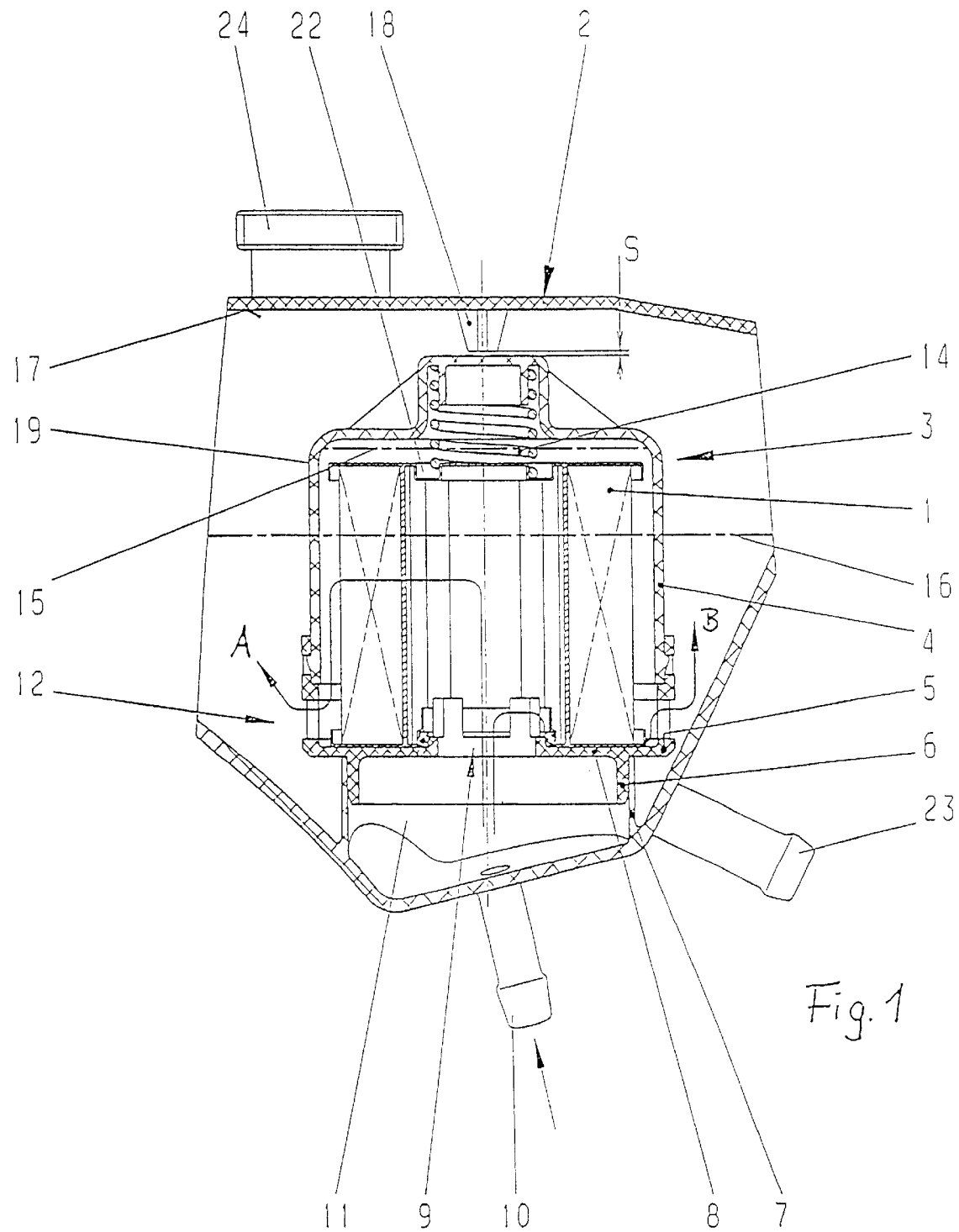
FIG. 1 is a sectional view of a first, very simple embodiment of a hydraulic fluid tank according to the present invention.

Referring to the drawings in particular, the hydraulic fluid tank designated as a whole by 2 in the figures accommodates a filter housing designated as a whole by 3. The hydraulic fluid tank 2 and the filter housing consist of plastic, preferably polyamide. A fluid filter 1 is inserted into the filter housing 3. The filter housing 3 has a two-part design and comprises in this case an imperforate upper part 4 and a lower part 5.

A collar 6 is made in one piece with the lower bottom 8 of the lower part 5. This collar 6, which is ring-shaped according to the embodiment being shown, is inserted into a complementary axial flange 7 of the hydraulic fluid tank 2 in a fluid-tight and firmly seated manner via a sealing ring 29. The axial flange 7 is an integral part of the hydraulic fluid tank 2, i.e., it is made in one piece therewith.

Figure 2:
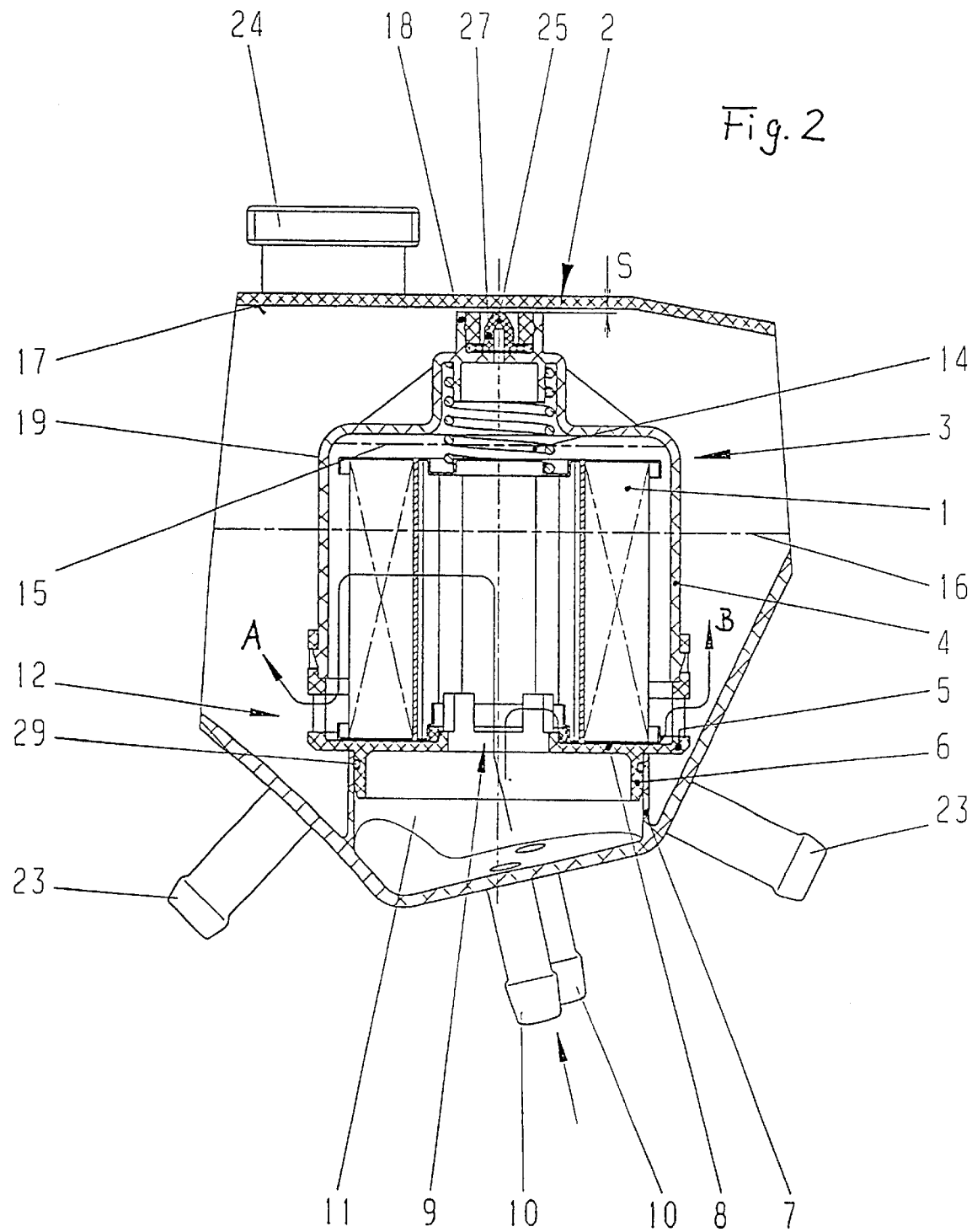
FIG. 2 is a sectional view of another embodiment of a hydraulic fluid tank according to the present invention.

Thus, an admission chamber 11, which has a pressure pipe joint 10 in the embodiment according to FIG. 1 and two pressure pipe joints 10 in the embodiment according to FIG. 2, is formed within the axial flange 7. Hydraulic fluid is introduced into the admission chamber 11 via these pressure pipe joints. The hydraulic fluid subsequently enters the filter housing 3 through an admission opening 9 present in the lower bottom 8 and it subsequently flows through the filter material of the fluid filter 1 in order to subsequently flow out into the hydraulic fluid tank through a plurality of outlet openings 12, which are provided in a ring-shaped edge of the lower part 5. The now purified hydraulic fluid can be fed from there via an intake fitting into the hydraulic system. The direction of flow of the hydraulic fluid is indicated by the arrow "A" in FIGS. 1 and 2.

Fibrous, metal or paper filters, which have a fineness between 10 $\mu$m and 20 $\mu$m but preferably 15 $\mu$m for the fluid filter and a fineness between 150 and 200 $\mu$m for the outlet openings, may be used as the filter material 13 according to the solutions being described.

The fluid filter 1 is supported within the filter housing 3 via a spring element 14 and is pressed as a result against the inner surface of the lower bottom 8 of the filter housing and is maintained under pretension. Corresponding to the dimensioning of the spring 14, a slight axial mobility of the fluid filter 1 can thus always be made possible when the dynamic pressure within the system exceeds the specified limit values. This may happen, e.g., when most of the filter material is clogged. The fluid filter 1 then moves slightly in the axial direction and the hydraulic fluid, which has flown into the filter housing 3 through the admission opening 9, is removed under the raised fluid filter 1 in the direction of the outlet opening 12. The direction of flow of the hydraulic fluid is indicated by arrow "B" in FIGS. 1 and 2.

FIGS. 1 and 2 also show that the fluid level 15 in the filter housing is above the fluid level 16 in the hydraulic fluid tank.

Figure 3:
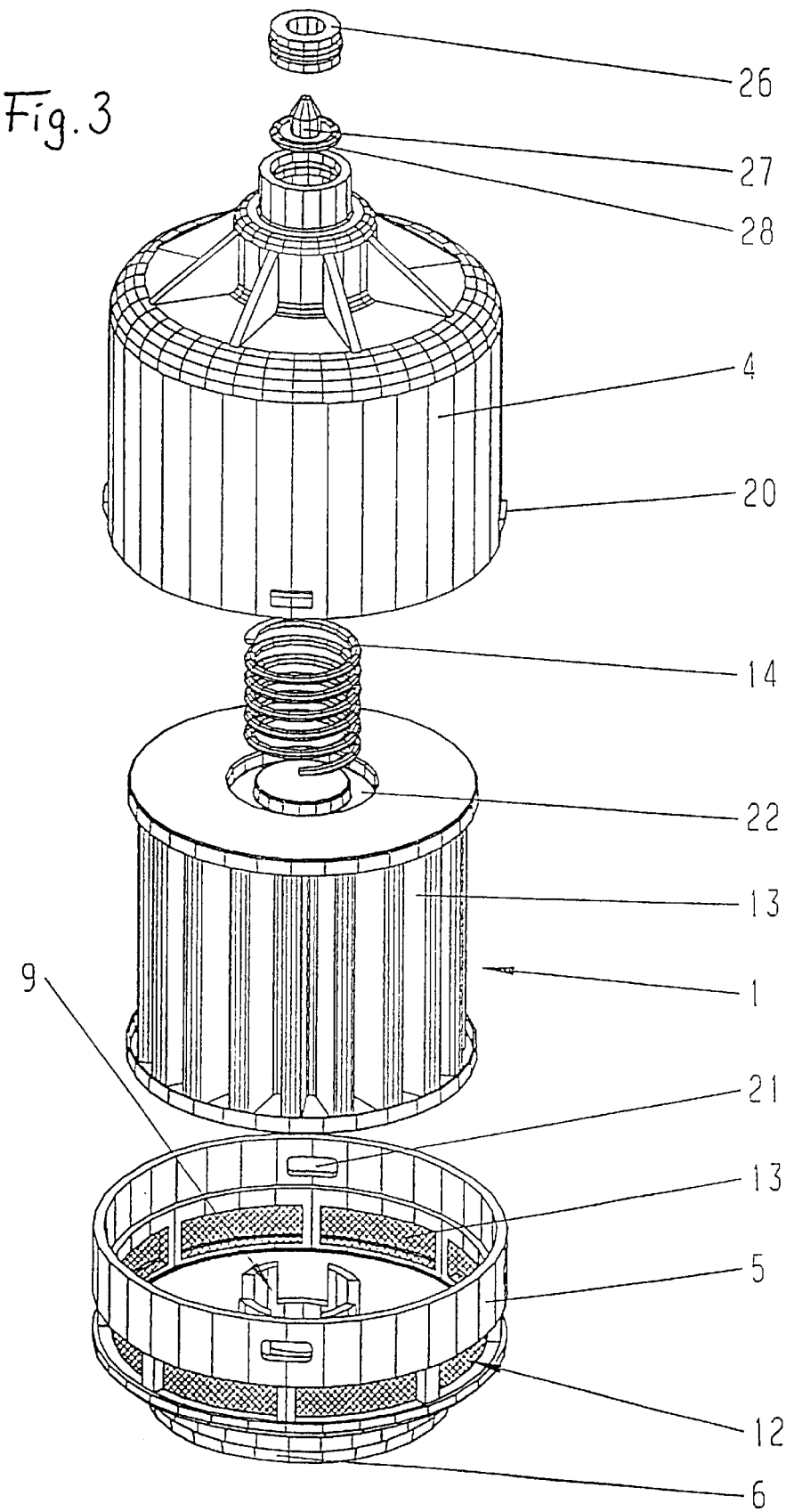
FIG. 3 is an exploded view of the filter housing of a hydraulic fluid tank according to the present invention.

As can be determined from FIG. 3, a filter material is inserted into the outlet openings 12. The spring element 14, which comprises a coil spring in this case, is accommodated in the upper part of the fluid filter 1 within an annular groove 22. The upper part 4 and the lower part 5 of the filter housing 3 are connected by a snap connection. This comprises a plurality of detents 20, which are arranged distributed on the circumference of the upper part 4 and engage complementary recesses 21 of the lower part 5.

To prevent the filter housing 3 from becoming detached from the axial flange 7 even in the case of a mechanical effect on the filter housing 3, which occurs, e.g., due to the moving hydraulic fluid, or to prevent the spontaneous separation of the upper part 4 from the lower part 5, a holding-down device 18 is arranged on the inner surface 17 of the hydraulic fluid tank in the embodiment according to FIG. 1. This holding-down device 18 is arranged at a short distance "s" from the outer surface 19 of the filter housing 3.

FIG. 2 differs from the embodiment shown in FIG. 1 in that, in a reversed manner, a holding-down device 18, which is arranged at a short distance "s" from the inner surface 17 of the hydraulic fluid tank 2, is made in one piece with the outer surface of the upper part 4 of the filter housing 3.

FIG. 2 also shows another, interesting embodiment of the present invention. It can be observed in nearly all hydraulic systems that air inclusions are temporarily present in the fluid. To prevent air from accumulating within the upper part 4, an air release device is provided, which opens automatically when a predetermined amount of air is present in the upper part 4 and thus it enables this air to escape. After the escape of the air, the air outlet opening closes again automatically. The air release device comprises for this purpose a conical valve 27 made of elastic rubber, which is slotted at its tip. The slots are closed in the normal state. A blind hole, which is directly in functional connection with the slots 25, is provided in the valve 27 from the underside, i.e., from the interior space of the filter housing 3. The valve disk 28 made in one piece with the valve 27 is sealingly supported by a corresponding surface in the upper part 4 of the filter housing 3. The valve is fixed in the upper part 4 by means of a closing part 26.

The first filling under vacuum of the entire system takes place via a fluid filler neck 24, into which the fluid is filled and via which air is drawn out of the hydraulic fluid tank 2 at the same time. The fluid filled in flows through the intake fitting 23 and all the units connected to it until it finally flows again into the hydraulic fluid tank 2 through the pressure pipe joint 10. This is done until the hydraulic fluid tank is filled with fluid up to its filling level mark. As a consequence of the vacuum prevailing in the system, it will then be possible in the above-described manner for the fluid level 15 in the filter housing 3 to be above the fluid level 16 in the hydraulic fluid tank 2.

While specific embodiments of the invention have been shown and described in detail to illustrate the application of the principles of the invention, it will be understood that the invention may be embodied otherwise without departing from such principles.

What is claimed is:

1. A motor vehicle hydraulic fluid tank with fluid filter combination, the combination comprising:

a fluid tank having a bottom portion including an inlet structure;

a filter housing disposed in said fluid tank, said filter housing having a lower part and an upper part;

a tubular fluid filter inserted into said filter housing in said hydraulic fluid tank wherein said filter is completely encapsulated within said housing;

wherein the lower part of the housing includes an admission opening connected to said inlet structure for directing unfiltered fluid into an interior of the tubular fluid filter;

an outlet opening in the lower part of the filter housing for directing filtered fluid from an interior of the filter housing to a space within the tank adjacently surrounding an exterior of the filter housing; and a spring element disposed between a top interior surface of the upper part of the filter housing and an upper end of said filter to bias a lower end of said filter against the lower part of the filter housing.

2. A hydraulic fluid tank in accordance with claim 1, wherein said filter housing upper part and said filter housing lower part are formed of two separate pieces.

3. A hydraulic tank in accordance with claim 1, wherein said filter housing comprises a snap connection connecting said upper part and said lower part.

4. A hydraulic fluid tank in accordance with claim 1, wherein said inlet structure comprises a collar inserted into a complementary axial flange present in the hydraulic fluid tank in a firmly seated and sealing manner, said collar being made in one piece with an outer surface of the lower part.

5. A hydraulic fluid tank in accordance with claim 4, wherein said inlet includes a pressure pipe joint in fluid connection with said admission opening, wherein hydraulic fluid to be filtered flows into said fluid filter via said pressure pipe joint and said admission opening, said axial flange and said lower part cooperate to form an admission chamber connecting said Pressure pipe joint to said admission opening.

6. A hydraulic fluid tank in accordance with claim 1, further comprising filter material at said outlet opening.

7. A hydraulic fluid tank in accordance with claim 1, wherein said spring permits said fluid filter to be slightly movable in an vertical direction relative to said housing.

8. A hydraulic fluid tank in accordance with claim 1, wherein the upper part of said filter housing is imperforate such that a fluid level within said filter housing is higher than a fluid level in said hydraulic fluid tank with said hydraulic fluid tank being filled under vacuum.

9. A hydraulic fluid tank in accordance with claim 1, further comprising a holding down-device, wherein said hydraulic tank has an inner surface with said holding-down device arranged on said inner surface opposite said upper part of said filter housing.

10. A hydraulic fluid tank in accordance with claims 9, wherein a short distance is provided between said holding-down device and said upper part of said filter housing.

11. A hydraulic fluid tank in accordance with claim 1, wherein said filter housing has at least one holding-down device arranged opposite an inner surface of said hydraulic fluid tank on an outer surface of said upper part.

12. A hydraulic fluid tank in accordance with claim 11, wherein a short distance is provided between said holding-down device and said inner surface of said hydraulic fluid tank.

13. A hydraulic fluid tank in accordance with claim 1, wherein hydraulic fluid tank is formed of plastic.

14. A hydraulic fluid tank in accordance with claims 13, wherein said hydraulic fluid tank is a multipart tank with parts connected by ultrasonic or orbital welding or bonding after the introduction of said filter housing.

15. A hydraulic fluid tank in accordance with claim 1, wherein said filter includes one or more of a fibrous filter material, a metal filter material or paper filter material.

16. A hydraulic fluid tank in accordance with claim 1, further comprising an automatically opening and closing air release device in said upper part of said filter housing.

17. A hydraulic fluid tank in accordance with claim 16, wherein said air release device comprises a conical valve having a slot at its tip, wherein said slot is closed in a normal state, said valve having a blind hole directly in functional connection with said slot, and a valve disk made in one piece with said valve and sealingly supported by a corresponding surface in said upper part of said filter housing, while the valve is fixed in said upper part by means of a closing part.

* * * * *